ial Number: 555,109

United States Patent [19]
Martin

[11] Patent Number: 4,979,285
[45] Date of Patent: Dec. 25, 1990

[54] METHOD OF CONNECTING A STACK OF LAMINATIONS FOR ELECTRIC MOTORS

[76] Inventor: Benson D. Martin, 1015 Golf Dr., Pontiac, Mich. 48341

[21] Appl. No.: 555,109

[22] Filed: Jul. 20, 1990

[51] Int. Cl.$^5$ ............................................. H02K 15/02
[52] U.S. Cl. ..................................... 29/598; 29/522.1; 29/609; 29/736; 29/738
[58] Field of Search ....................... 29/596, 598, 522.1, 29/736, 738, 609; 310/216, 217, 42

[56] References Cited

U.S. PATENT DOCUMENTS

| | | |
|---|---|---|
| 2,254,589 | 9/1941 | Williams . |
| 2,975,312 | 3/1961 | Ploran ................................ 310/217 |
| 3,202,851 | 8/1965 | Zimmerle et al. ................... 310/259 |
| 4,280,275 | 7/1981 | Mitsui .................................... 29/732 |
| 4,760,632 | 8/1988 | Rapp ..................................... 29/432.1 |

*Primary Examiner*—Carl E. Hall
*Attorney, Agent, or Firm*—Charles W. Chandler

[57] ABSTRACT

A method of retaining a series of plates together in a stacked relationship, using integral projections and mating recesses formed by punching dies. As each plate is added to the stack, a restriking die is driven against the exposed face of the newly added plate to form transverse notches in the plate surface. The plate is thus deformed so that material flows into previously formed notches in a subjacent plate. The displaced material acts as a frictional interlock with the subjacent plate.

12 Claims, 2 Drawing Sheets and the corresponding longitudinal side edges 31 of each deformed section 14

METHOD OF CONNECTING A STACK OF LAMINATIONS FOR ELECTRIC MOTORS

BACKGROUND AND SUMMARY OF THE INVENTION

This invention relates to a method of joining multiple plates together to form a unitary coherent stack of plates. The invention has applicability in the formation of rotors for electric motors, wherein the rotor comprises a stack of plates laminated together along the rotor's axial dimension. Typically, the rotor is comprised of about sixty steel plates, having a diameter of about three inches and an individual plate thickness of about 0.025 inch. The axial length of the formed rotor is about one and one-half inches.

Under this invention, the plates are held together solely by means of integral projections extending from each plate into mating recesses formed in an adjacent plate. Reciprocating dies (punches) are used to simultaneously form a projection on one face of each plate and a recess on the other face of the plate. The plates are individually added to a stack of plates, with the projections on each newly added plate nested into recesses in the end plate in the stack.

As each plate is added to the stack of plates, a restriking die is actuated to form notches in the exposed face of the newly added plate. The plate material in axial alignment with each notch is extruded into a registering notch in the end plate of the stack so as to form a frictional connection between the newly added plate and the stack of plates. The restriking (notching) process is employed as each plate is added to the stack.

It has been proposed to laminate plates together, using integral projections and recesses in opposite surfaces of the plates. Prior art of interest includes U.S. Pat. No. 2,975,312 to W. J. Ploran; U.S. Pat. No. 3,202,851 to W. Zimmerle, et al; U.S. Pat. No. 4,280,275 to Y. Mitsui; U.S. Pat. No. 4,760,632 to E. Rapp; and U.S. Pat. No. 2,254,588 to J. Williams.

The present invention is believed to represent an improvement over the art in the addition of a restriking (notching) step for increasing the frictional adherence between the plates.

THE DRAWINGS

FIG. 9 pictorially illustrates the relative dimensions and actions of the two die mechanisms.

DESCRIPTION OF A PREFERRED EMBODIMENT OF THE INVENTION

Figure 1:
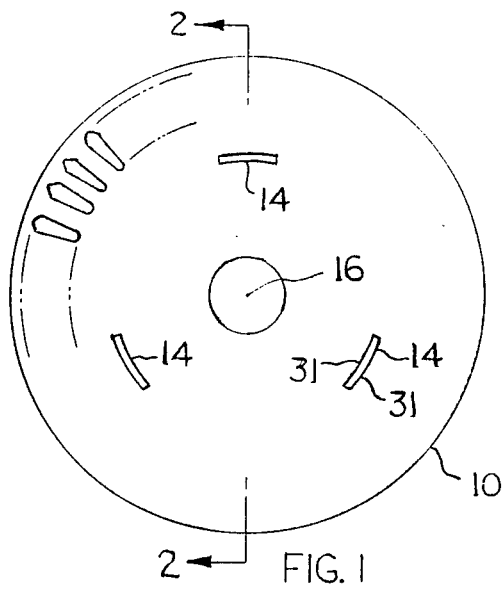
FIG. 1 is an end view of a stack of plates formed by the present invention.
Figure 2:
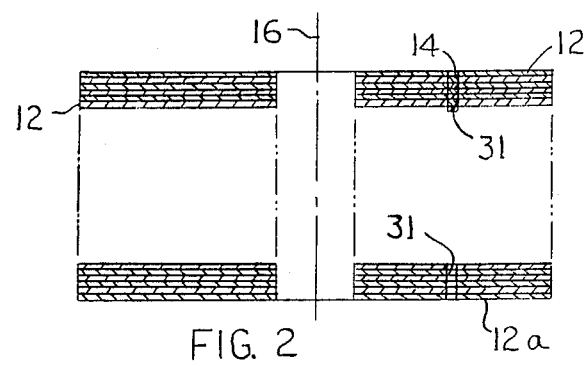
FIG. 2 is a sectional view on line 2—2 in FIG. 1.

FIGS. 1 and 2 show a cylindrical rotor 10 for an electric motor. The rotor is comprised of a series of circular plates 12 stacked one on another. Typically, each plate has a thickness of about 0.025 inch. The assembly of stacked plates has an axial length on the order of two inches. Each plate can has a diameter of approximately three inches.

As seen in FIGS. 1 and 2, the plates have deformed sections 14 projecting from the plate planes in the axial direction, i.e., parallel to the rotor rotational axis 16. Each deformed section 14 forms a recess in the face of the plate remote from the deformed projection. The plates are arranged so that projections on each plate nest into recesses in an adjacent plate. The plates are held together by the frictional fits of the various projections in the mating recesses.

Figure 5:
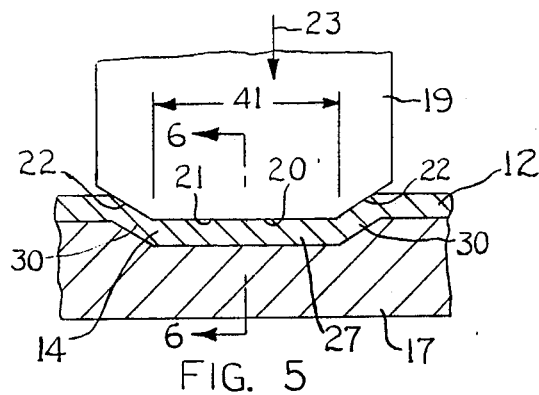
FIG. 5 is a view of an apparatus used to form localized projections on a representative plate prior to assembling the plate onto a plate stack.
Figure 6:
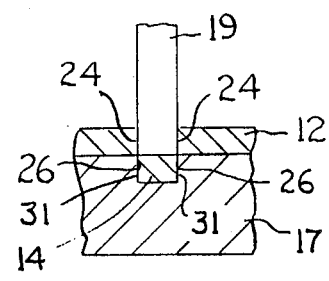
FIG. 6 is a transverse sectional view taken on line 6—6 in FIG. 5.

FIGS. 5 and 6 illustrate a mechanism for forming a projection on an individual plate 12. The die mechanism comprises a female die 17 having a concavity in its upper face and a male die 19 having a lower end face 20 adapted to exert a downward deformation force on the upper face of plate 12. The lower face of male die 19 includes a flat central area 21 extending normal to the direction of die motion 23, and two end areas 22 angulated upwardly from central area 21 at an angle of about thirty degrees.

Longitudinal side faces 24 on die 19 extend vertically parallel to the direction of die motion. The corresponding side faces 26 on female die 27 are in an axial registry with side faces 24 such that when die 19 is driven downwardly to the position of FIGS. 5 and 6, the deformed section of plate 12 is severed along the plate penetration lines of die side faces 24. Die 17 provides support for plate 12 in the zones outboard from side faces 26.

The stroke of male die 19 corresponds to the thickness of plate 12, e.g., 0.025 inch, such that central elongated wall portion 27 of deformed section 14 is downwardly offset from plate 12 by a distance equal to the thickness of the plate. Central elongated wall 27 is attached to plate 12 via two angulated connector walls 30. The angle between each connector wall 30 and central wall 27 may be about thirty degrees.

It will be seen from FIGS. 5 and 6 that deformed section 14 is relatively short in one direction (FIG. 5), and relatively short in the transverse direction (FIG. 6). Typically, the deformed section will have a length (FIG. 5) on the order of three-eighths inch, and a transverse width (FIG. 6) of about onesixteenth inch. The longitudinal side edges 31 of deformed section 14 (formed by the plate severing action of die faces 24) will extend vertically normal to the plane of plate 12.

Figure 4:
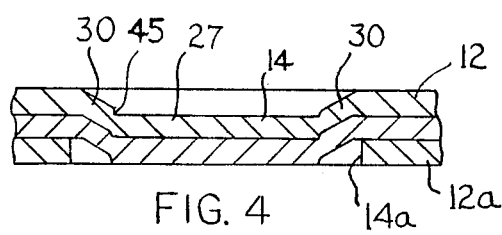
FIG. 4 is a sectional view taken on line 4—4 in FIG. 3.
Figure 3:
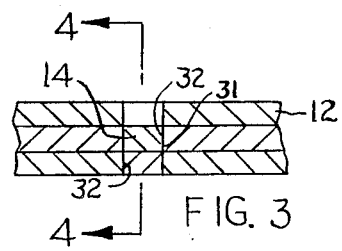
FIG. 3 is an enlarged fragmentary sectional view taken in the same direction as FIG. 2.

As shown in FIG. 1, there are three deformed sections 14 in a given plate. The longitudinal side edges 31 of each deformed section are arcuate in the plan dimension, as seen in FIG. 1. However, these edges could be straight, if so desired. FIG. 2 shows various deformed sections 14 offset downwardly from the top plate. Each deformed section nests within a cavity (recess) formed by the deformed section in the next lowermost plate in the stack. FIGS. 3 and 4 show the nested relationship in somewhat greater detail. The plates are held together, at least partially, by frictional engagement between the longitudinal side edges 31 of each deformed section 14 and the side edge surface 32 of a cavity formed in the next lowermost plate.

Each plate 12, with the exception of the lowermost plate in the stack, has three deformed sections 14 formed thereon. More deformed sections could be used if necessary. The lowermost plate, designated by numeral 12a in FIG. 4, has an elongated slot 14a formed therein. This slot defines longitudinal slot side surfaces adapted to frictionally interlock with the longitudinal side edges on the next uppermost plate, for retaining the lowermost plate in position on the stack. The use of slot 14a gives the end plate 12a a smooth surface contour, which is desirable in many cases.

The gripping action of side edges 31 on each deformed section 14 is enhanced by making the deformed section relatively long in the longitudinal direction (FIG. 5). Central wall 27 is preferably at least four times the length of each connector wall 30, such that each severed side edge 31 on the central wall has a relatively large surface area. Large area contact between edges 31 and the longitudinal edges 32 of the associated recesses in the next lowermost plate promotes a firm gripping interlock between the plates.

Figure 7:
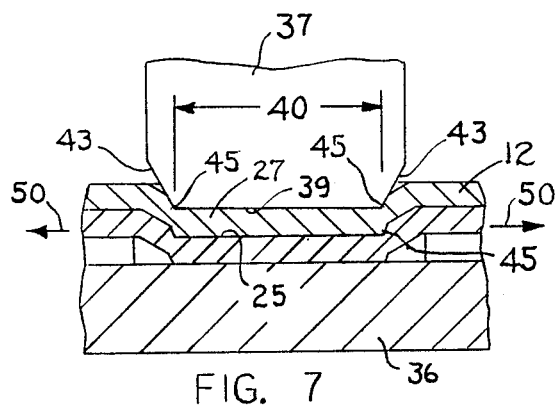
FIG. 7 is a fragmentary sectional view taken through a stack of plates during a restriking process according to this invention.
Figure 8:
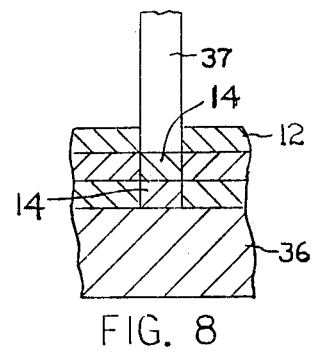
FIG. 8 is a transverse sectional view taken on line 8—8 in FIG. 7.

In order to augment the gripping effect of side edges 31, it is proposed under the present invention to subject each plate 12 to a restriking operation when the plate is initially assembled onto the stack of plates. FIGS. 7 and 8 fragmentarily illustrate a restriking die mechanism that can be used.

The die mechanism of FIGS. 7 and 8 includes a flat base plate 36 having pilot elements, not shown, for orienting the various plates 12a and 12 in vertical alignment, with the deformed sections 14 of each plate extending into the registering recesses formed by the projections in the next lowermost plate. A male die 37 is located directly above each set of aligned plate deformations 14. The die is adapted to be driven downward to the position of FIGS. 7 and 8. After each downstroke, the male die is raised upwardly above the stack of plates to permit an additional plate to be added to the stack. The male die is then again driven downwardly to strike the newly added upper plate in the stack. This sequence of adding a new plate to the stack and driving the male die down onto each newly added plate is repeated until a designated stack height is reached.

Male die 37 has a central elongated plate deformation face 39 that has a length dimension 40 that is greater than the length dimension 41 of the central elongated wall portion 27 of each plate deformation 14. The transverse width dimension of the male die 37 is essentially the same as the width dimension of the recess formed in the upper face of plate 12. End faces 43 of the male die extend angularly upward from die face 39 to form relatively sharp corners at the lines where end faces 43 meet die face 39. The angularity between each end face 43 and central face 39 is preferably about sixty degrees.

Because face 39 of restriker die 37 is longer than the associated central wall 27 in subjacent plate 12, the corner areas at the ends of face 39 form triangular notches 45 in the plate 12 material when die 37 is driven downwardly to the position of FIGS. 7 and 8. The stroke of die 37 is selected so that face 39 abuts against the upper surface of central wall 27 without materially reducing the cross-sectional thickness of wall 27 (except for the localized reductions caused by notches 45).

As each triangular notch 45 is formed in the upper face of central wall 27, the deformed wall material on the undersurface of wall 27 is caused to flow into a triangular notch 45 previously formed in the next lowermost plate 12. The flow of wall 12 material would be generally downward, except that the upwardly facing horizontal surface 25 of the triangular notch acts as a stop mechanism to redirect the material longitudinally outwardly, as indicated by directional arrows 50 in FIGS. 7 and 9.

Material flows into each notch 45 (below the uppermost plate 12) to substantially fill the notch space. However, the downward nature of the forces associated with the notching operation causes the displaced material to be somewhat densified in the lowermost portion of the notch along surface 25. The displaced densified material exerts a gripper force on notch surface 51. This gripper force action in the arrow 50 direction, augments the gripper action of side edges 31, thereby providing added assurance of a satisfactory frictional interlock between the plates in the stack.

Figure 9:
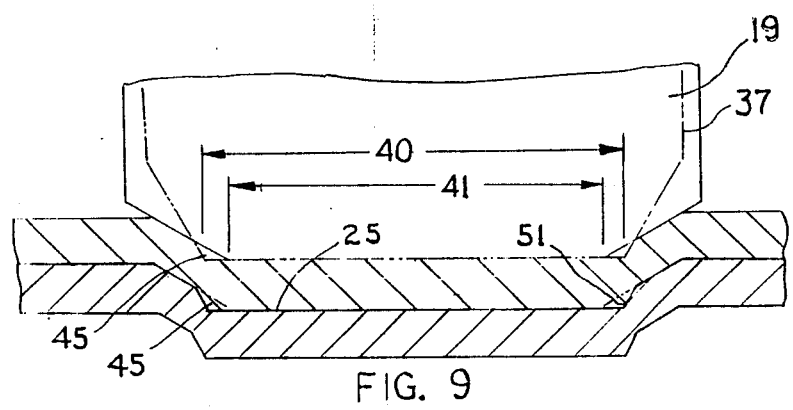
FIG. 9 is an enlarged composite view of two separate die mechanisms depicted in FIGS. 5 and 7.
Figure 10:
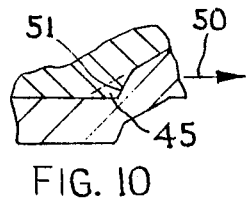
FIG. 10 is a fragmentary sectional view of the FIG. 9 plate system with the die mechanisms removed.

FIG. 9 is a composite view showing the male die 37 superimposed on the original forming die 19. The work deformation faces of the two dies are of different lengths (in the plane of FIG. 9) in order to enable die 37 to form the triangular notches 45. The length difference can be approximately the same as the wall thickness of plate 12, e.g., 0.025 inch in a typical situation. Corresponding length dimensions of the two die deformation faces are designated by numerals 40 and 41.

It was earlier noted that each end face 43 of die 37 is angled to the plane of die face 39 at about sixty degrees. Such an angle gives the downflowing displaced material a slight outward motion component in the arrow 50 direction. The angularity also facilitates separation of die 37 from the work after the restriking operation.

This invention is concerned primarily with the restriking operation depicted in FIGS. 7 through 10. The broad concept of adhering plates together by means of nested projections is old in the art. The drawings show particular structural arrangements and configurations. However, it will be realized that some variation in structural details can be resorted to while still following the teachings of this invention.

I claim:

1. A method of joining multiple plates together to form a plate stack, comprising the steps of:
    deforming and severing individual plates so that the deformed section of a given plate comprises a central elongated wall having two severed side edges extending generally parallel to the longitudinal axis of the deformed section, and two angulated plate connector walls at opposite ends of said central wall;
    positioning a first of said plates on a stack of similarly constructed plates so that the deformed section of the first plate is nested within the recess formed by the deformed section of the end plate in the stack, with the severed side edges of the deformed section of said first plate being in frictional engagement with the severed side edges of said end plate;
    driving a die against the exposed face of the central elongated wall and portions of the associated connector walls, to thereby notch the first plate and increase the frictional engagement force between the first plate and the end plate in the stack; and
    repeating the positioning step and die driving step, using additional plates constructed similarly to said first plate.

2. The method of claim 1, wherein the deforming and severing step is carried out so that the central elongated wall is offset from the plane of the associated plate by a distance that is equal to the thickness of the individual plate.

3. The method of claim 1, wherein the die driving step is carried out so that the die contacts both plate connector walls with essentially the same force.

4. The method of claim 1, wherein the deforming and severing step is carried out so that the thickness of the central elongated wall is the same as the thickness of the associated plate.

5. The method of claim 1, wherein the deforming and severing step is carried out so that the length of the central elongated wall is several times the length of each connector wall.

6. The method of claim 1, wherein the die driving step is performed with a die that has a plate deformation face whose length in the longitudinal direction is significantly greater than the length of the central elongated wall.

7. The method of claim 6, wherein the die driving step is performed with a die that has two end faces, each extending at an angle of approximately sixty degrees to said plate deformation face.

8. The method of claim 7, wherein the plate deformation face on the die extends normal to the direction of die motion.

9. The method of claim 8, wherein the deforming and severing step is carried out so that the plate connector walls extend at an angle of approximately thirty degrees relative to the central elongated wall.

10. The method of claim 6, wherein the die driving step is carried out so that triangular notches are formed at the ends of the central elongated wall.

11. The method of claim 6, wherein each plate has a thickness of about 0.025 inch, and the difference in length of the die plate deformation face and central elongated wall is about 0.025 inch.

12. The method of claim 6, wherein the difference in length between the die plate deformation face and the central elongated wall is approximately the same as the thickness of each plate.

* * * * *